United States Patent

Margen

[15] 3,681,920
[45] Aug. 8, 1972

[54] METHOD AND MEANS FOR GENERATING ELECTRICITY AND VAPORIZING A LIQUID IN A THERMAL POWER STATION

[72] Inventor: Peter Heinrich Erwin Margen, Taby, Sweden

[73] Assignee: Aktiebolaget Atomenergi, Stockholm, Sweden

[22] Filed: Jan. 19, 1970

[21] Appl. No.: 4,148

[30] Foreign Application Priority Data

Jan. 20, 1969 Sweden ....................... 715/69
May 5, 1969 Sweden ..................... 6333/69

[52] U.S. Cl. ............................ 60/67, 60/5, 60/73, 60/89, 60/105, 202/173, 203/11, 165/107
[51] Int. Cl. .............................................. F01k 17/02
[58] Field of Search ...... 60/73, 89, 105, 67; 202/173; 203/11; 165/107

[56] References Cited

UNITED STATES PATENTS 3,411,571  11/1968  Lawrence .................. 165/107
3,451,220   6/1969  Buscemi ....................... 60/73

Primary Examiner—Martin P. Schwadron
Assistant Examiner—Allen M. Ostrager
Attorney—McGlew and Toren

[57] ABSTRACT

A thermal power plant operates with a varying production of electric power. Simultaneously, the heat generated in the plant is used for evaporating a liquid in a multi-stage vaporizing process. When the plant operates at low electric power the excess heat capacity of the plant is accumulated in a heat-accumulator. When the plant operates at high electric power, said accumulated heat is used for evaporating the liquid in the vaporizing process. In this way the vaporizing process can be operated continuously and steadily, independent of the variations in the production of electric power.

8 Claims, 12 Drawing Figures

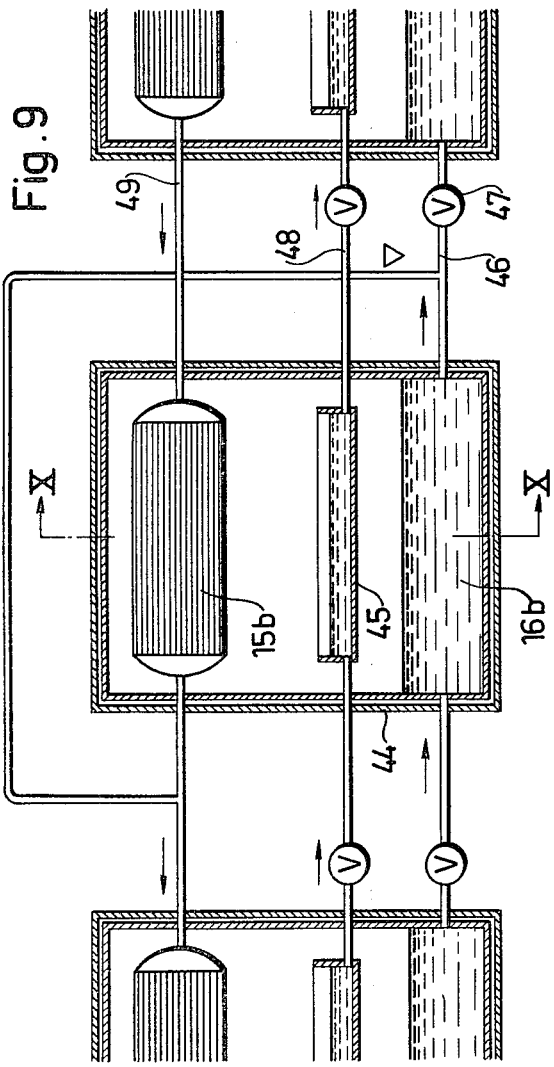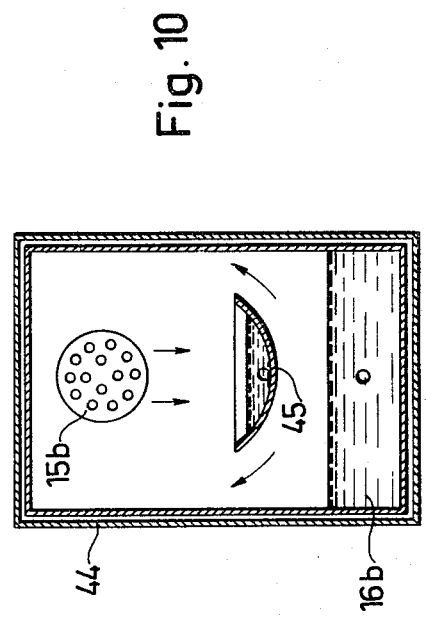

METHOD AND MEANS FOR GENERATING ELECTRICITY AND VAPORIZING A LIQUID IN A THERMAL POWER STATION

The invention relates to a method and means in a thermal power station, run on nuclear fuel or fossil fuel, operating with a varying production of electric power, of exploiting the excess capacity of the heat-generating machine at low electric power to vaporize a liquid. The invention is particularly directed to removing salt from water by vaporizing salt-water and condensing the steam produced.

Several proposals have previously been put forward for thermal power plants having double function, namely the production of electricity and the removal of salt from water by vaporization. Such proposed equipment has consisted of a steam-generating machine, a turbo-generator and an evaporation plant. The steam to drive the evaporation equipment is suitably obtained in the form of low pressure steam from a suitable stage in the turbine. It has generally been assumed that all the units in the plant operate continuously with constant load.

In practice, however, the demand for electricity varies throughout a 24 hour period, for example with peak periods in the morning and afternoon. The turbo-generator must be dimensioned to cope with the peak periods. However, it is uneconomical also to dimension the steam-generating machine and the vaporizing equipment for varying loads. The object of the invention is therefore primarily to provide a method and equipment which permits the steam-generator and the vaporizing equipment to operate continuously with full load, whereas the load on the turbo-generator varies throughout a 24 hour period.

In the method according to the invention the liquid is vaporized in a multi-stage vaporizing process, preferably by pressure-reduction in successive stages, and the liquid entering is preheated in a plurality of stages by condensation of the steam generated during the vaporizing process. The method according to the invention is characterized in that at low electric power, liquid which has been heated by means of said excess capacity in a heat-exchanger is led to the top of a liquid-container serving as heat-accumulator, cooler liquid being simultaneously taken out from the bottom of the liquid-container to be heated by means of said excess capacity, and at high electric power cooler liquid is led to the bottom of the liquid-container and simultaneously heated liquid is led from the top of the liquid-container to the vaporizing process, and that at low electric power the liquid is heated by means of said excess capacity to such a temperature that the difference in temperature between the hot liquid at the top of the container and the cooler liquid at the bottom of the container is equal to the temperature difference between water entering the first stage of the vaporizing process, corresponding to the outlet temperature from the heat-exchanger, and the temperature of the water entering the final stage, or some stage before the final stage, in the preheating stage.

The use of a heat-accumulator in the form of a liquid-container thus makes it possible to accumulate heat during periods of low electric power, and to exploit this heat to operate the vaporizing equipment during periods of high electric power. The level of the limit between the hot and the cold liquid in the heat-accumulator varies, but the total volume is held constant and it is thus possible to run the vaporizing process, or at least most of its stages, with a constant flow of liquid.

The temperature difference $\Delta T$ between steam and water in the pre-heating stage should be as small as possible since the quantity of vaporized water varies in reverse proportion to this temperature difference. In order to be able to accumulate as much heat as possible in a liquid-container of a certain volume the temperature difference between the hot and the cold liquid in the accumulator should, according to the invention, be at least twice the difference in temperature between two adjacent stages in the vaporization process. This great temperature difference in the liquid-container can be reconciled with the smaller temperature difference in each preheater by shunting the flow through the liquid-container during the period of high electric power over at least one stage in the vaporizing process. More specifically, preheated liquid is withdrawn from a point before the last preheating stage. This liquid is led to the bottom of the liquid-container and a corresponding quantity of heated liquid from the top of the liquid-container is led to the first vaporizing stage.

The invention also relates to a plant for generating electricity of varying power and vaporizing a liquid at a vaporization speed which is independent of the varying electric power. The plant comprises a heat-generating machine, a turbine driven by the heat generating machine, an electric generator driven by the turbine, an evaporation apparatus comprising a plurality of stages for vaporizing a liquid and at least one stage for preheating the liquid, preferably with the steam generated in the vaporizing stages, a heat-exchanger for additional heating of the preheated liquid by means of the excess capacity in the heat-generating machine which arises at low electric power, and a liquid-container serving as heat-accumulator, conduits being arranged to lead heated liquid, at low electric power, from the heat-exchanger to the top of the liquid-container and take out cooler liquid from the bottom of the container, and, at high electric power, to lead preheated liquid from the preheating stage to the bottom of the liquid container and lead hot liquid from the top of the liquid-container to the vaporizing stages. The plant is characterized in that the conduits to the liquid-container are so arranged that, at high electric power, the liquid-container can be shunt-connected over at least one stage in the evaporation apparatus, and that the heat-exchanger is arranged to raise the temperature of the preheated liquid at least twice as much as the difference between two adjacent stages in the evaporation apparatus.

In the following the invention will be further described with reference to the accompanying drawings.

FIG. 9 shows one embodiment of the vaporizing and preheating apparatus.

FIG. 10 shows a section along the line X—X in FIG. 9.

For facilitating the understanding of the drawings, arrows of four types have been used to indicate the direction of flow in the conduits of FIGS. 1, 5, 9, 11 and 12. An arrow of the type 63, see FIG. 1, indicates the direction of flow during a period of high electric power. An arrow of the type 64 indicates the direction of flow during a period of medium electric power. An arrow of the type 65 indicates the direction of flow during a period of low electric power. An arrow of the type 66 indicates that the direction of flow is the same during periods of high, medium, and low electric power.

Figure 1:
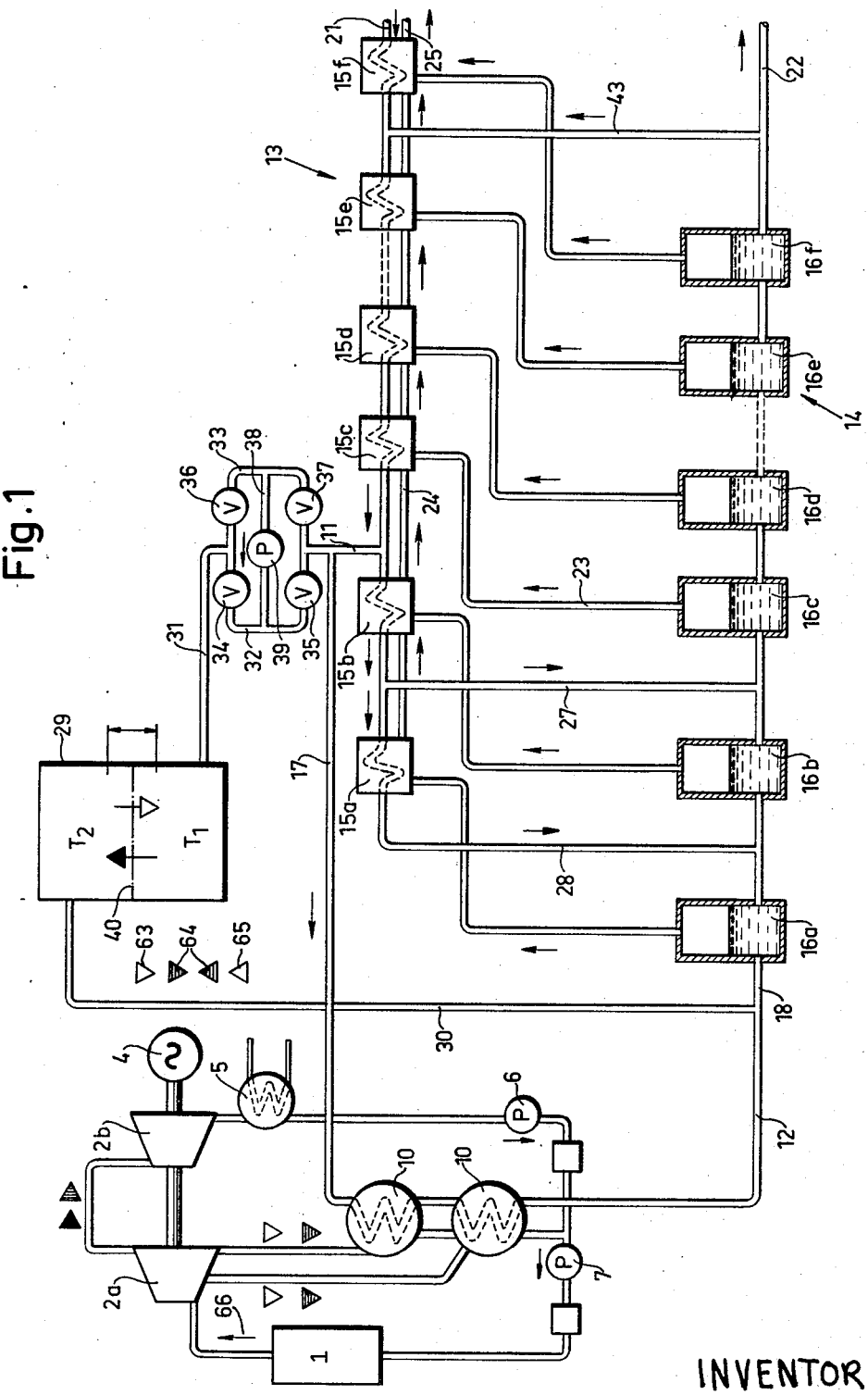
FIG. 1 shows a plant according to the invention for removing salt from water.

In the plant according to FIG. 1 the heat-generating apparatus consists of a nuclear reactor 1 which is cooled by boiling water and which delivers high-pressure steam to a turbine 2 comprising a high-pressure part 2a and a low pressure part 2b. The turbine drives an electric generator 4. The steam from the low-pressure part 3 of the turbine is condensed in a condensor 5 and the water is returned to the nuclear reactor 1 by pumps 6-7.

Steam can be taken out from the high-pressure part 2a of the turbine to a heat-exchanger 10.

On the steam side the heat-exchanger 10 is divided into two parts which receive steam of different temperatures from the turbine. The heat-exchanger 10 is part of a circuit pertaining to an evaporation apparatus comprising a preheating part 13 and a vaporizing part 14. The preheating part 13 comprises a plurality of preheating stages, only a few of which are shown: 15a–15f. The vaporizing part 14 comprises a plurality of vaporizing stages, only a few of which are shown: 16a–16f. The salt water to be vaporized is supplied to the preheating part through a conduit 21 and the salty residue after evaporation is removed from the vaporizing part through a conduit 22. At each vaporizing stage 16 vaporization is effected by subjecting the water, which is at boiling point, to a pressure decrease. The steam produced is led through a conduit 23 to one of the stages 15 in the preheating part. The condensate is led through a conduit 24 to the preheating stage immediately preceding it. The condensate from all the preheating stages is withdrawn through a conduit 25. The vaporizing part and the preheating part are connected in known manner by means of a conduit 43 through which a smaller quantity, for example one fifth, of the salty residue after evaporation is returned to the preheating part, preferably between the first and second parts of the preheating part. This feed-back, which is normally used in evaporation plants of this type, gives a correct mass balance which agrees with the heat fluxes in the plant.

The water flow from the preheating stage 15c separates into a smaller part, which in the present case is assumed to be one third of the total flow, which continues into a conduit 11, and a larger part, in the present case two thirds of the total flow, which continues to the preheating stage 15b. After this stage 15b, the flow separates into two equal parts, each thus corresponding to one third of the total flow. One of these parts is led through a conduit 27 to the vaporizing part 14 where it enters between stages 16b and 16c. The remainder of the flow is led through the last stage 15a of the preheating stage and then to the vaporizing part where it enters between stages 16a and 16b.

The plant illustrated also comprises a water-container 29. A conduit 30 extends from the top of the water-container to the conduit 12 which connects the heat-exchanger 10 and the vaporizing part 14. A conduit 31 extends from the bottom of the water-container to the conduit 11 between the preheating part 13 and the heat-exchanger 10. The conduit 31 has two parallel branches 32, 33, each containing two valves 34, 35 and 36, 37. The branch conduits 32, 33 are connected by means of a conduit 38 containing a pump 39 and being connected to the branch conduits between the valves. With the help of the valves 34–37 the pump 39 can transport water in the desired direction in the conduit 31.

The plant illustrated operates in the following manner, reference also being made to the flow diagrams in FIGS. 2-4: First the method of operation during low load will be described. The generator 4 then gives such low power that a large quantity of steam can be withdrawn from the high-pressure stage 2a of the turbine to the heat-exchanger 10. The preheated water having a temperature of $T_1$ which flows from stage 15c through conduit 11 mixes with water of the same temperature which flows from the bottom of the water-container 29 through the conduit 31. The mixture, corresponding to two thirds of the total flow entering (see FIG. 4) flows through the conduit 17 to the heat-exchanger 10 where it is heated to a temperature of $T_2$ by the steam from the high-pressure part 2a of the turbine. The water thus heated then separates into one stream which flows through conduits 12, 18 to the first stage 16a of the vaporizing part and another stream of equal size which flows through conduits 12, 30 to the top of the water-container 29. Heat is thus accumulated in the container 29 because hot water with a temperature of $T_2$ enters at the top and cooler water having a temperature of $T_1$ is removed from from the bottom. The boundary layer 40 between hot and cold water thus moves down.

During peak loading the generator 4 draws such high power that no stream can be withdrawn from the high pressure part 2a of the turbine. The pump 39 with its valves 34–37 is now arranged to lead water having a temperature $T_1$ from the preheating stage 15c through the conduits 11, 31 to the bottom of the water-container 29 (see FIG. 2). A corresponding quantity of water having a temperature $T_2$ is led from the top of the water-container through the conduit 30 to the first stage 16a of the vaporizing part. The boundary layer 40 thus moves up. The water passing the water-container 29 is led past two stages in the evaporation plant, that is the preheating stages 15a and 15b. The temperature difference $T_2-T_1$ will thus be equal to the temperature difference between water entering the penultimate preheating stage and water leaving the heat-exchanger 10.

If, during medium electric load, the excess capacity of the reactor is exactly that required to supply the evaporation plant 13, 14 with heat, no water is allowed to pass the water-container 29. The flow diagram for such a case is shown in FIG. 3.

Figure 2:
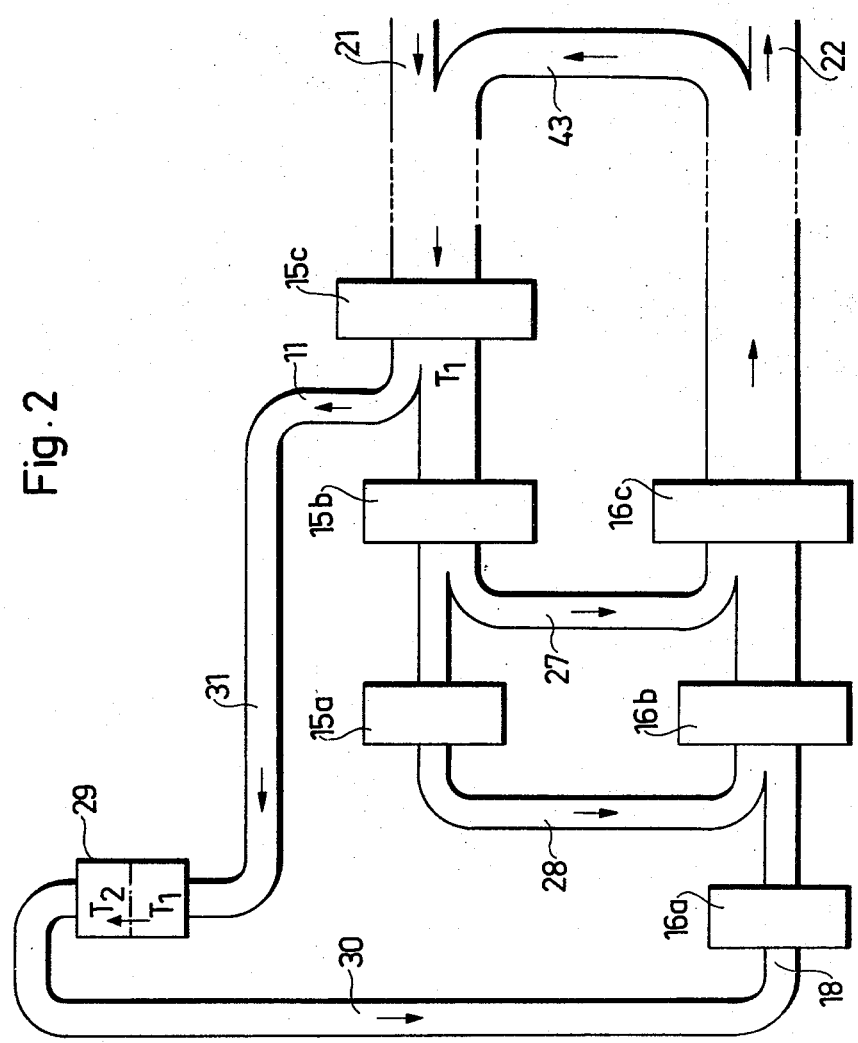
FIGS. 2–4 show the salt-water flow through the plant according to FIG. 1 in three different cases: at maximum electric power (FIG. 2) at medium electric power (FIG. 3) and at minimum electric power (FIG. 4).
Figure 3:
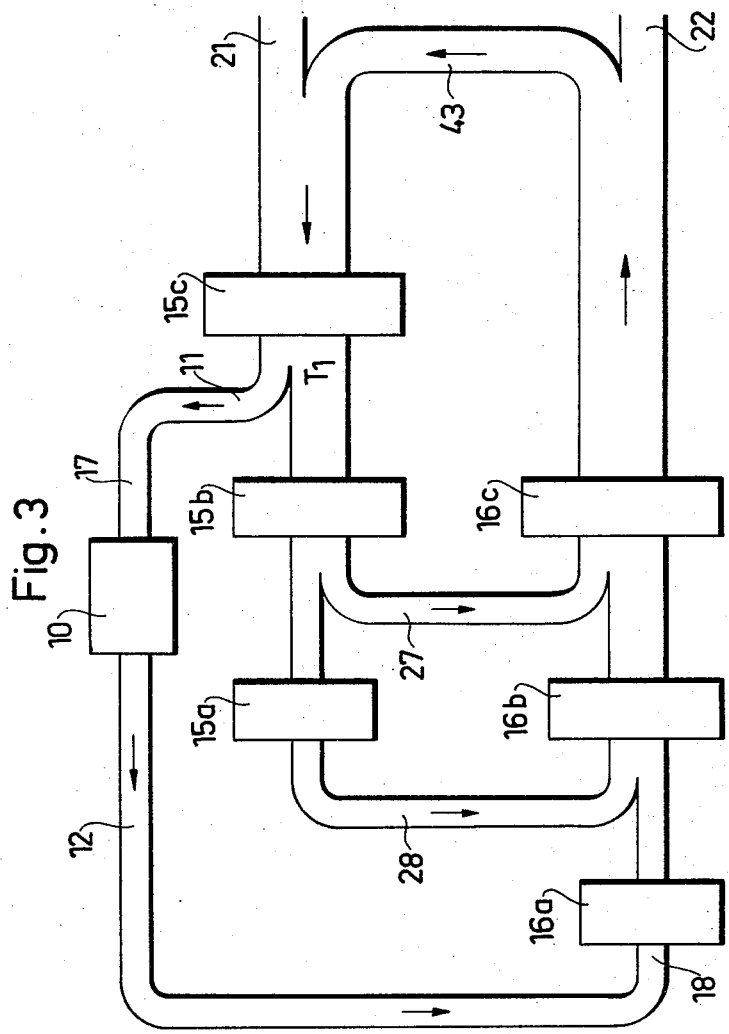
Figure 4:
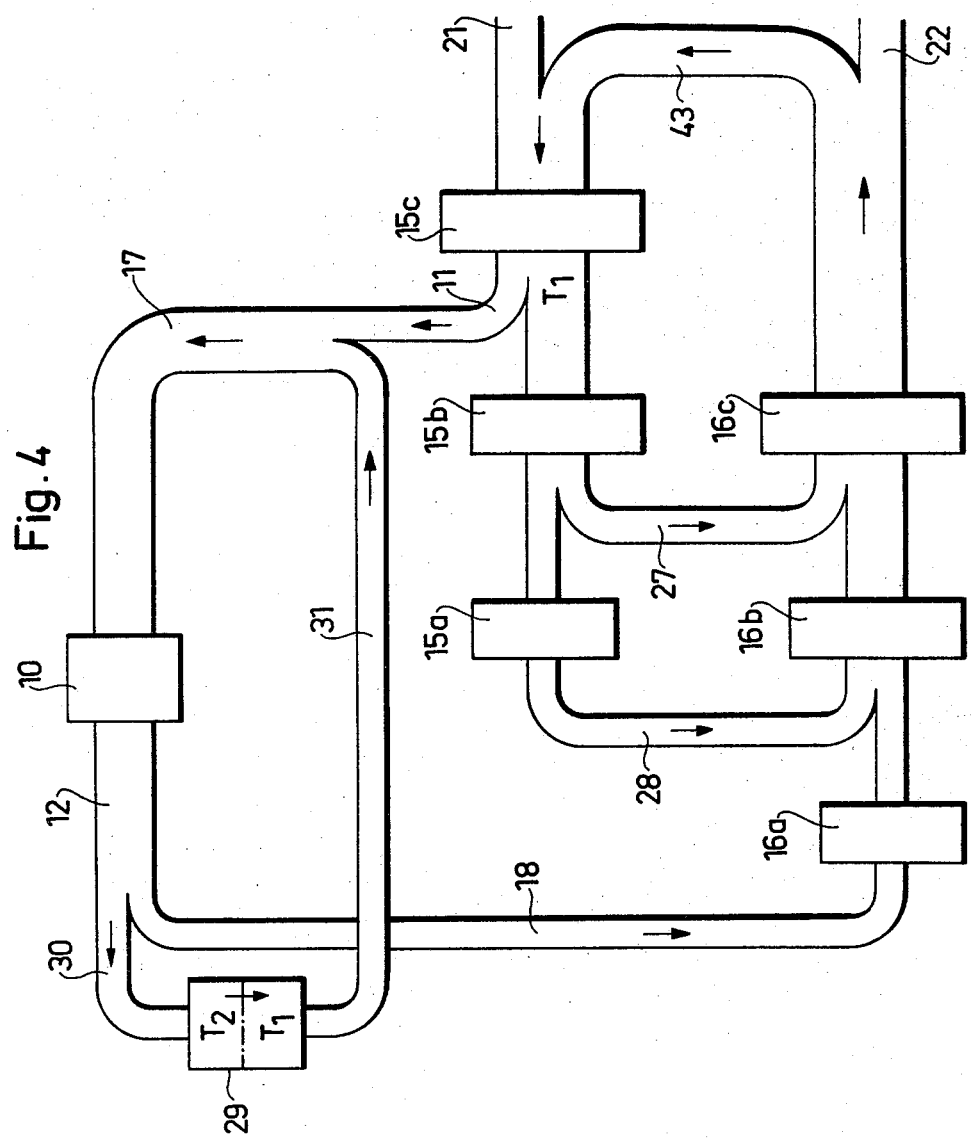

If the load is between the two cases represented by FIGS. 3 and 4, or between the two cases represented by FIGS. 3 and 2, a small quantity of water is allowed to pass the accumulator 29, in the first case to charge the accumulator and in the second case to discharge the accumulator. The direction and the quantity of the water passing through the accumulator can easily be adjusted with the help of valves 34–37.

Figure 5:
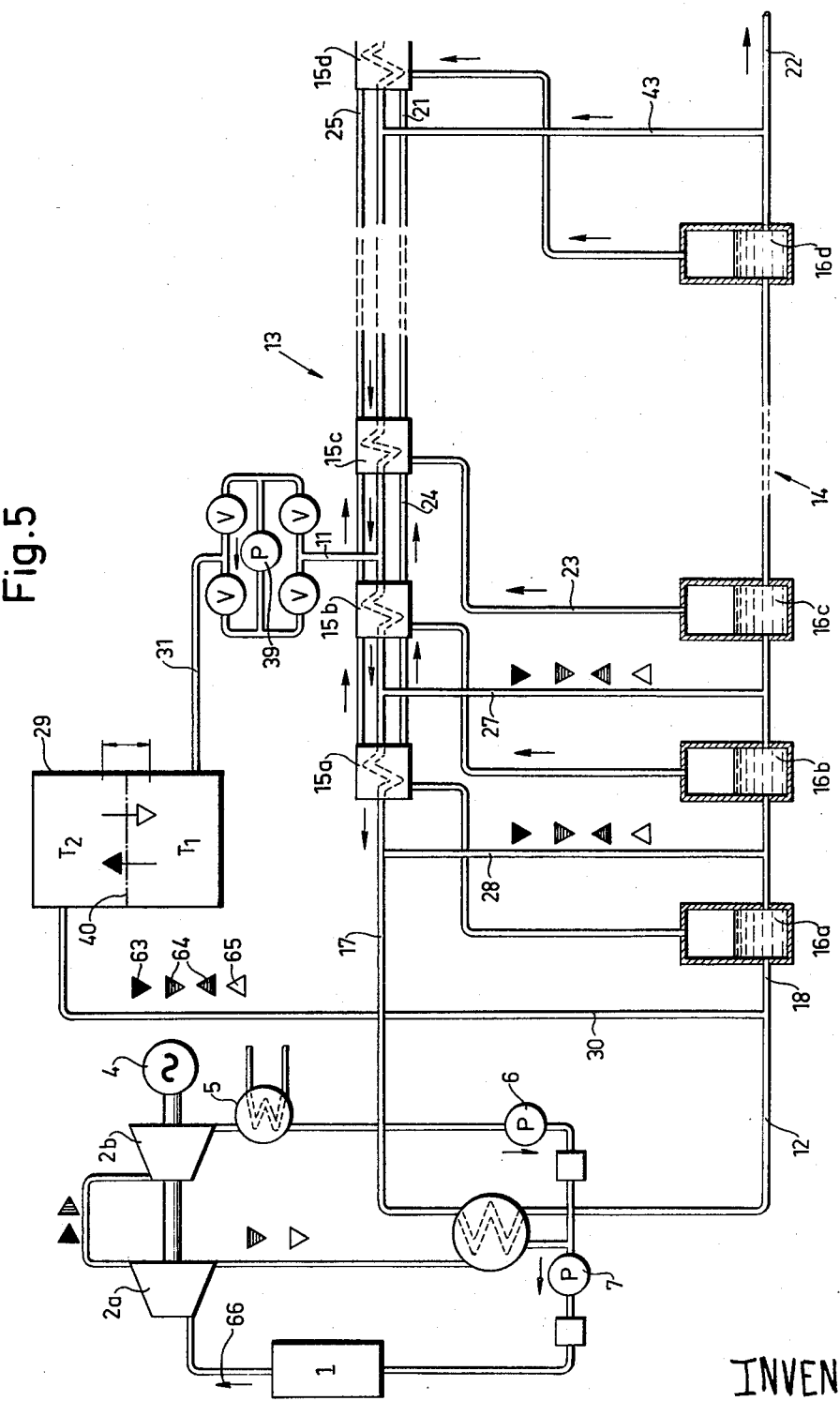
FIG. 5 shows another plant according to the invention for removing salt from water.
Figure 6:
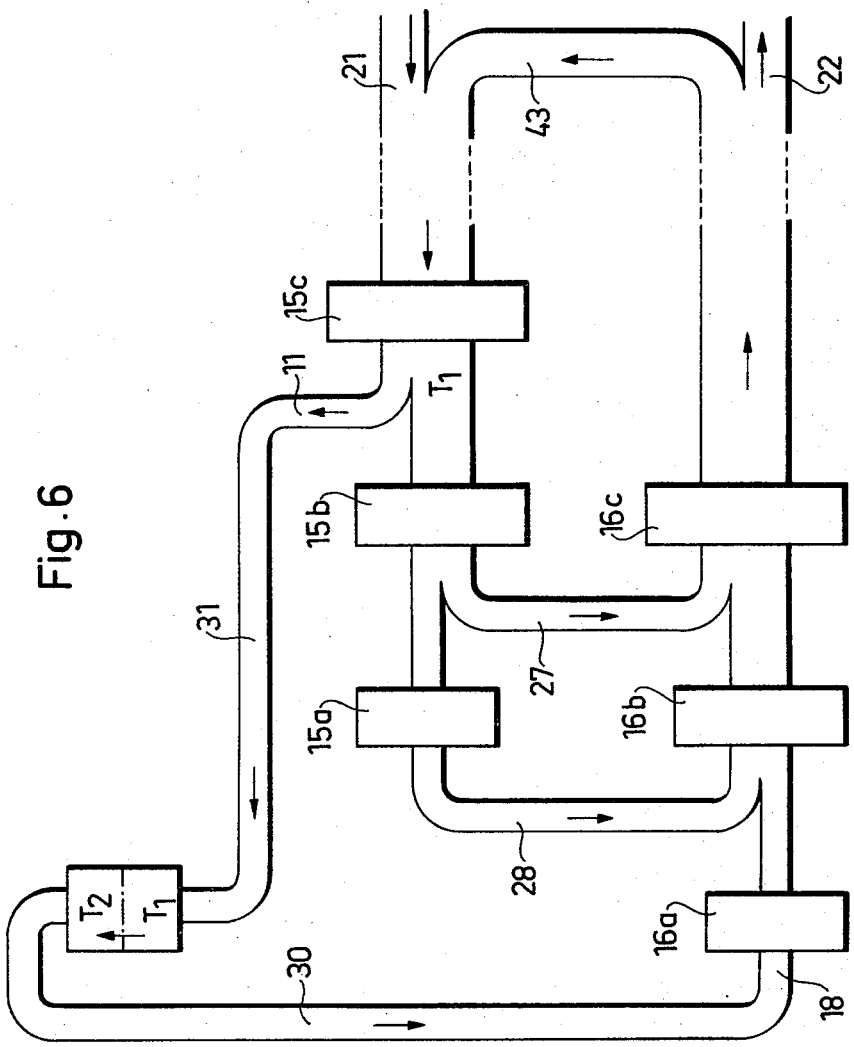
FIGS. 6-8 show in the same way as FIGS. 2-4 the salt-water flow through the plant according to FIG. 5 at maximum, medium and minimum electric power.
Figure 7:
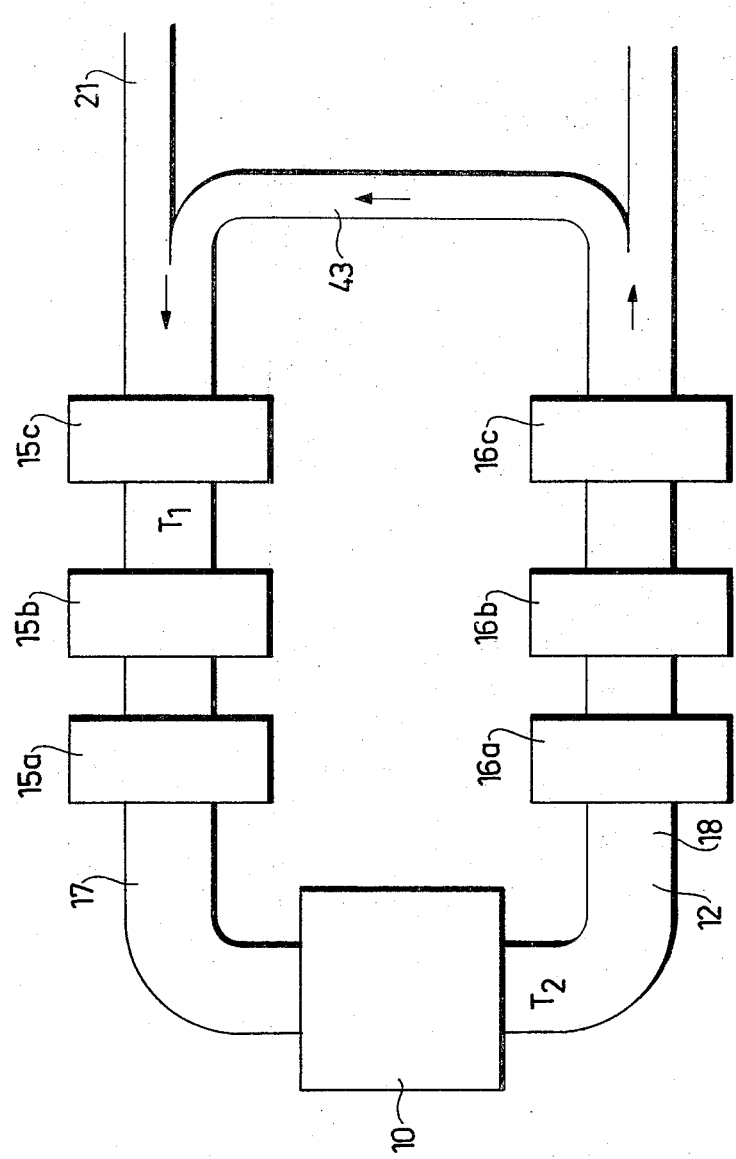
Figure 8:
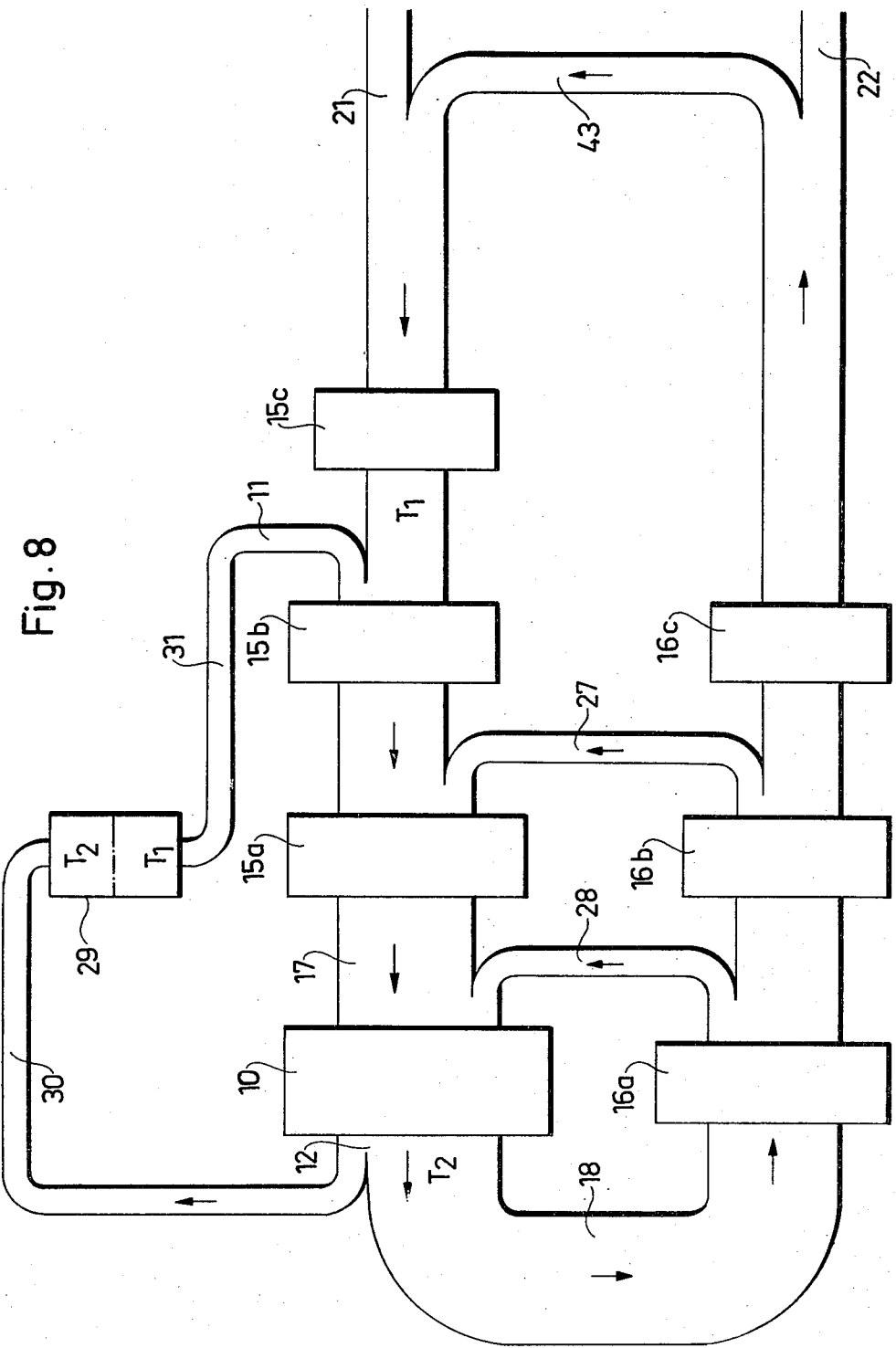

FIG. 5 shows a modification of the plant according to FIG. 1. Corresponding parts have the same reference numbers. The difference is that in the plant according to FIG. 5 the preheated water led to the heat-exchanger 10 is withdrawn from a point after the last preheating stage 15a and not, as in the case in FIG. 1, from a point between stages 15b and 15c. The resultant salt-water flows are shown in FIG. 6 which shows the flow at maximum electric load, that is when the maximum quantity of heat must be taken out of the accumulator 29, in FIG. 7 which shows the flow at medium electric load, when the excess capacity of the reactor is exactly that required to supply the evaporation plant with heat, and in FIG. 8 which shows the flow at minimum electric load, when the accumulator 29 is charged at maximum speed.

The advantage with the plant according to FIG. 5 is that the quantity of condensate per time unit is somewhat greater than with the plant according to FIG. 1. A disadvantage is, however, that the last two stages 15a, 15b of the preheating part and the first two stages 16a, 16b of the vaporizing part are subjected to varying flow, see the flow diagrams in FIGS. 6–8. In the stages 15a and 16a the salt-water flow, as can be seen, varies between one third and five thirds of the flow entering the preheating part. Stages 15a, 15b and 16a, 16b must therefore be dimensioned larger than is the case in the plant according to FIG. 1. Similarly, in the plant according to FIG. 5, the heat-exchanger 10 must be dimensioned for a greater flow and a lower temperature difference than is the case in the equipment according to FIG. 1.

The drawings accompanying this application illustrate an embodiment where the temperature difference $(T_2-T_1)$ over the accumulator is 3 times as great as the temperature increase $\Delta T$ in a preheating stage. In practice, however, the optimum value of $(T_2-T_1)$ is often considerably greater than $3 \Delta T$, which can be achieved by increasing the number of shunt conduits between the preheating stages 15 and the vaporizing stages 16.

By a suitable choice of the number of shunt conduits any desired value for $(T_2-T_1)$ can be selected within a very large range. In each case in practice an optimum value can be calculated which depends, inter alia, on the cost of the accumulator, heat costs and the price which can be obtained for the electric power.

FIGS. 9 and 10 show a part of the evaporation apparatus, namely the preheating stage 15b and the composite vaporizing stage 16b. These stages are surrounded by a container 44 at the bottom of which is the boiling salt solution. The salt solution flows from stage to stage through conduits 46 having valves 47. With the help of the valves the flow and pressure drop can be regulated, and thus the temperature drop, for each stage. The steam condenses on the tubes to the heat-exchanger in the preheating stage 15b and the condensate runs down into a collecting trough 45 and is carried on to the next stage through a conduit 48. The salt solution being preheated is led from stage to stage through conduits 49.

Figure 11:
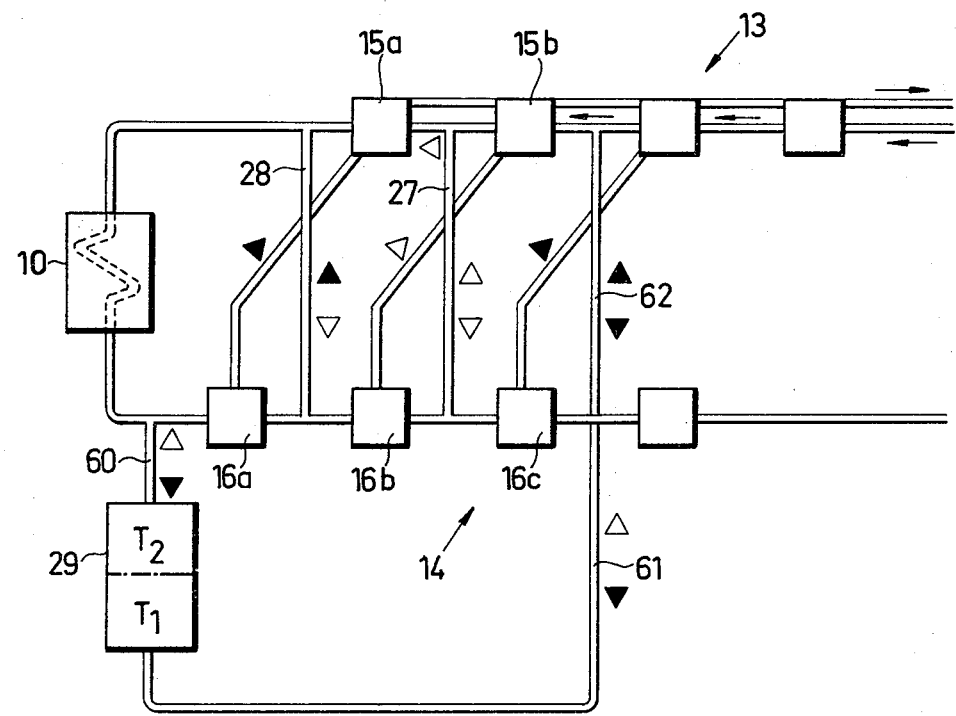
FIG. 11 shows another plant according to the invention, for removing salt from water.

In the embodiments shown so far, at low electric power load the heat-accumulator is shunted over two preheating stages. However, it can in a similar way be shunted over one, two or more vaporizing stages. An example of such an embodiment is shown in FIG. 11. The same designations as in previous figures have been partially used. A conduit 60 is connected from the top of the accumulator 29 to the conduit connecting the heat-exchanger 10 with the first vaporizing stage 16a. A conduit 61 extends from the bottom of the accumulator to the conduit between two vaporizing stages. From the latter conduit a conduit 62 is arranged to a point between two preheating stages. The conduit 62 is similar to the conduits 27, 28 described in connection with previous figures.

In the plants described with reference to FIGS. 1–11 the steam produced in successive stages by pressure reduction is condensed in a series of heat-exchangers by being brought into indirect contact with the liquid entering to be preheated. It has been found that it is possible to condense the steam produced by bringing it into direct contact with cooler condensate. This method of condensing the steam is characterized in that in at least some and preferably all the vaporizing stages the generated steam is condensed by being brought into direct contact with cooler condensate from the vaporizing stage immediately subsequent, that the condensate from the first vaporizing stage is led in heat-exchanging counter-flow to the liquid entering, and that a part of the condensate leaving the first preheating stage of the liquid is returned to the last vaporizing stage to condense the steam generated there.

The apparatus used for this method of condensing the steam is characterized in that each vaporizing stage comprises a container in which liquid boils due to pressure reduction, the container comprising a collecting trough for condensate and a supply means, preferably a spray means, for cooler condensate from the vaporizing stage immediately subsequent, and a conduit to transfer the condensate to the collecting trough in the vaporizing stage immediately preceding, a conduit being arranged to lead the condensate from the first vaporizing stage through the liquid-preheater in heat-exchanging counter-flow to the liquid entering, and a conduits being arranged to return a part of the condensate from the liquid-preheater to the last vaporizing stage.

This method of condensing the steam will now be described with reference to FIG. 12. Similar parts have the same reference characters as in FIGS. 1–11.

Figure 12:
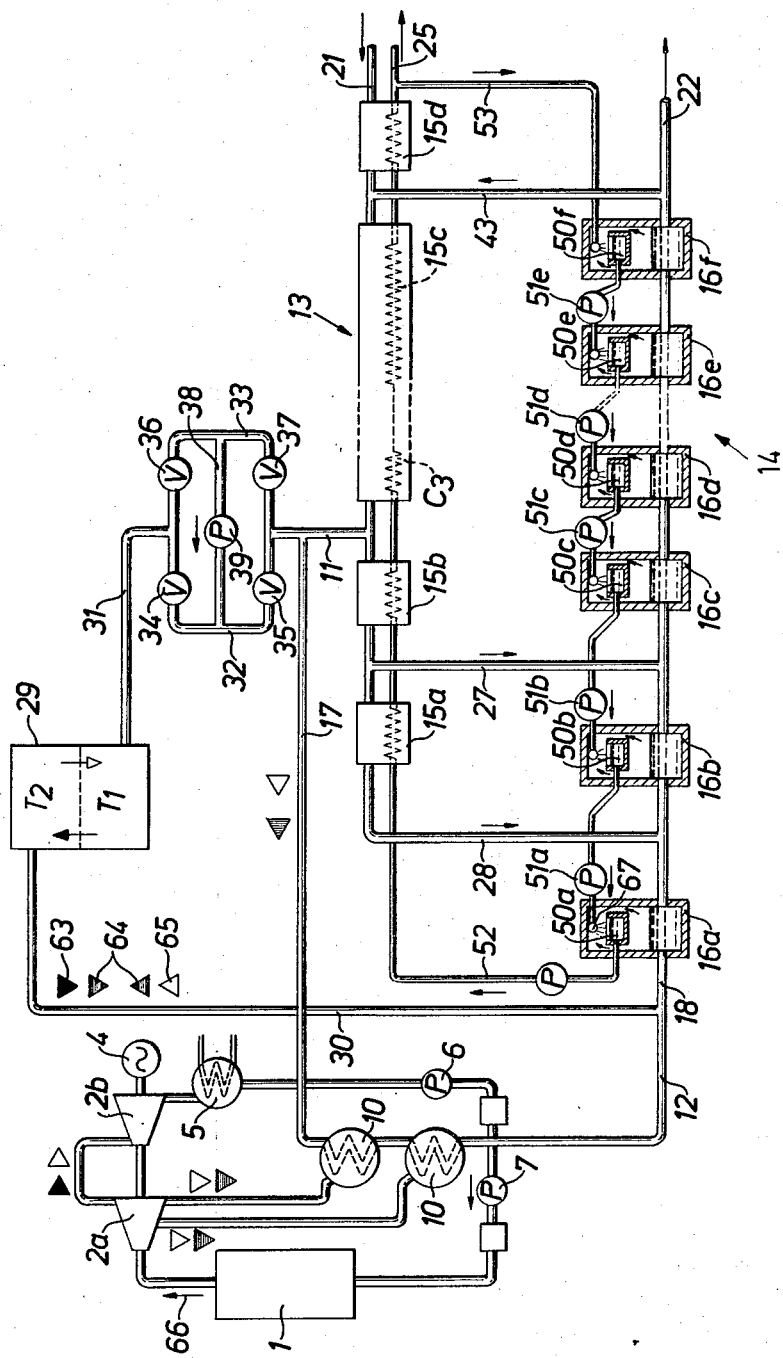
FIG. 12 shows another plant according to the invention, for removing salt from water.

The plant illustrated in FIG. 12 is to a large extent similar to that disclosed in FIG. 1, and reference is therefore made to the description of FIG. 1 as far as the general construction and operation of the plant is concerned. The difference between the two plants resides in the preheating part 13 and the vaporizing part 14, and these parts are to be described below.

The steam produced in each stage 16a–16f of the vaporizing part 14 of the plant illustrated in FIG. 12, is condensed by being brought into direct contact with a spray of cooler condensate which is pumped in from the immediately subsequent vaporizing stage. The condensate is collected in a collecting trough 50 and pumped by a pump 51 to the vaporizing stage immediately preceding to condense the steam generated there. The condensate is led from the first vaporizing stage 16a through a conduit 52 and the heat-exchangers 15a–15d in counter-flow to the water entering through the conduit 21. A part of the condensate is led from the first preheating stage 15d through a conduit 53 to the last vaporizing stage 16f and the remainder leaves the plant through a conduit 25.

What is claimed is:

1. A method of utilizing in a thermal power station operating with varying production of electric power, the excess capacity of the heat-generating machine, at low electric power, for vaporizing a liquid in a multi-stage vaporizing process, the liquid being preheated in a number of stages by means of the steam generated during the vaporizing process, characterized in that, at low electric power, liquid which has been heated by means of said excess capacity in a heat-exchanger is led to the top of a liquid-container serving as heat-accumulator, cooler liquid being simultaneously taken out from the bottom of the liquid-container to be heated by means of said excess capacity, and at high electric power cooler liquid is led to the bottom of the liquid-container and simultaneously heated liquid is led from the top of the liquid-containers -container to the vaporizing process, and that, at low electric power, the liquid is heated by means of said excess capacity to such a temperature that the difference in temperature between the hot liquid in the top of the container and the cooler liquid in the bottom of the container is equal to the temperature difference between the outlet temperature from the heat-exchanger and the temperature of the water entering the final stage, or some stage before the final stage, in the preheating stages.

2. A method according to claim 1, characterized in that, at low electric power, at least half the quantity of the preheated liquid is led to the vaporizing process, that the remainder of the preheated liquid is heated by means of said excess capacity, and that some of the liquid heated in this way is led to the top of the liquid-container and the remainder of the liquid heated in this way is led to the vaporizing process.

3. A method according to claim 2, characterized in that the remainder of the preheated liquid is led off before the final stage of the preheating process, or some stage before the final stage.

4. A method according to claim 1, characterized in condensing the steam produced in at least some of, and preferably all of the vaporizing stages by bringing the steam into direct contact with cooler condensate from the vaporizing stage immediately subsequent passing the condensate from the first vaporizing stage in heat-exchanging counter-flow to the liquid entering flowing through the preheating stages, and returning part of the condensate leaving the first preheating stage to the last vaporizing stage to condense the steam generated in said last vaporizing stage.

5. A plant for use as a thermal power station operating with variable electric power production in which the excess heat generated at low electric power production is used for vaporizing a liquid in a multi-stage vaporizing arrangement, the plant comprising a heat-generating machine, a turbine driven by this heat-generating machine, an electric generator driven by the turbine, an evaporation apparatus comprising a plurality of stages for vaporizing a liquid and at least one stage for preheating the liquid, a heat-exchanger for additional heating of the pre-heated liquid by means of the excess capacity in the heat-generating machine which arises at low electric power production, a liquid-container serving as heat-accumulator, conduit means including control means being arranged to lead heated liquid, at low electric power production, from the heat-exchanger to the top of the liquid-container and to take out cooler liquid from the bottom of the container, and, at high electric power production, to lead preheated liquid from the preheating stages to the bottom of the liquid-container and to lead hot liquid from the top of the liquid-container to the vaporizing stages, characterized in that the conduit means to the liquid-container are so arranged that, at high electric power production, the liquid-container can be connected in shunt over at least one stage in the evaporation apparatus, and that the heat-exchanger is arranged to raise the temperature of the preheated liquid to such an extent that the difference in temperature between the hot liquid at the top of the container and the cooler liquid at the bottom of the container is equal to the temperature difference between the outlet temperature from the heat-exchanger and the temperature of the water entering the final stage, or some stage before the final stage, in the preheating stages.

6. A plant according to claim 5, characterized in that the heat-generating machine is a steam-generating machine, that the turbine is a steam-turbine and that conduits are arranged to lead steam from the steam-turbine, preferably its high pressure part, to the heat-exchanger.

7. A plant according to claim 6, characterized in that the heat-exchanger comprises two stages and that conduits are arranged to lead steam of two different pressures from the turbine to the heat-exchanger.

8. A plant according to claim 5, characterized in that each vaporizing stage comprises a container in which liquid boils due to pressure reduction, the container comprising a collecting trough for condensate and a supplying means, preferably a spray means, for cooler condensate from the vaporizing stage immediately subsequent, and a conduit to transfer the condensate to the collecting trough in the vaporizing stage immediately preceding, a conduit being arranged to lead the condensate from the first vaporizing stage through the liquid-preheater in heat-exchanging counter-flow to the liquid flowing through the preheating stages, and a conduit being arranged to return a part of the condensate from the liquid-preheater to the last vaporizing stage.

* * * * *